(12) United States Patent
Lee et al.

(10) Patent No.: US 8,717,373 B2
(45) Date of Patent: May 6, 2014

(54) IMAGE PROCESSING APPARATUS

(75) Inventors: Young-ki Lee, Changwon (KR); Hyo Park, Changwon (KR); Hyun-joong Kong, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 1269 days.

(21) Appl. No.: 12/554,154

(22) Filed: Sep. 4, 2009

(65) Prior Publication Data

US 2010/0053178 A1  Mar. 4, 2010

(30) Foreign Application Priority Data

Sep. 4, 2008 (KR) .................. 10-2008-0087426

(51) Int. Cl.
 G06T 1/00 (2006.01)
 G06T 11/20 (2006.01)
 G06F 13/14 (2006.01)

(52) U.S. Cl.
 USPC ............... 345/522; 345/441; 345/520

(58) Field of Classification Search
 None
 See application file for complete search history.

(56) References Cited

U.S. PATENT DOCUMENTS

| | | | | |
|---|---|---|---|---|
| 6,636,214 B1 * | 10/2003 | Leather et al. | ............. | 345/422 |
| 8,010,652 B2 * | 8/2011 | Wang et al. | ............. | 709/224 |
| 2007/0074216 A1 | 3/2007 | Adachi et al. | | |
| 2007/0252912 A1 * | 11/2007 | Valente et al. | ............. | 348/458 |

FOREIGN PATENT DOCUMENTS

| | | |
|---|---|---|
| CN | 1860445 A | 11/2006 |
| CN | 101025910 A | 8/2007 |
| JP | 2000-299841 A | 10/2000 |
| JP | 2001-169275 A | 6/2001 |
| JP | 2005-346301 A | 12/2005 |
| JP | 2006-245744 A | 9/2006 |
| KR | 10-2002-0039693 A | 5/2002 |
| KR | 10-2007-0084355 A | 8/2007 |
| KR | 10-2008-0054480 A | 6/2008 |
| WO | 2005/096634 A1 | 10/2005 |

OTHER PUBLICATIONS

Chinese Office Action issued by the State Intellectual Property Office of P.R. China on Jul. 28, 2011 in counterpart Chinese Patent Application No. 200910168920.3.
Office Action issued Jul. 24, 2012 by the Japanese Patent Office in counterpart Japanese Application No. 2009-202350.
Communication dated Apr. 1, 2013 issued by the State Intellectual Property Office of P.R. China in counterpart Chinese Patent Application No. 200910168920.3.
Communication dated Apr. 3, 2013 issued by the Korean Intellectual Property Office in counterpart Korean Patent Application No. 10-2008-0087426.

* cited by examiner

*Primary Examiner* — Kee M Tung
*Assistant Examiner* — Leon T Cain, II
(74) *Attorney, Agent, or Firm* — Sughrue Mion, PLLC

(57) ABSTRACT

An image processing apparatus and method are provided. The image processing apparatus includes: at least one image input unit, to which a plurality of input images are input according to respective frame rates; and a controller that arranges an operation time and an operation order of each of tasks for processing a corresponding image of the plurality of input images according to the respective frame rates, and performs each of the tasks according to the operation time and the operation order.

20 Claims, 3 Drawing Sheets

→ TIME (ms)

| | 10 | 20 | 30 | 40 | 50 | 60 | 70 | 80 | 90 | 100 | 110 | 120 | 130 | 140 | 150 | 160 | 170 | 180 | 190 | 200 |
|---|---|---|---|---|---|---|---|---|---|---|---|---|---|---|---|---|---|---|---|---|
| Task1 | | | | | | | | | | O | | | | | | | | | | O |
| Task2 | | | | O | | | | | O | | | | O | | | | | | | O |
| Task3 | | O | | | O | | O | | | O | | | O | | | O | | | | |
| Task4 | | | | | O | | | | | O | | | | | O | | | | | |

IMAGE PROCESSING APPARATUS

CROSS-REFERENCE TO RELATED PATENT APPLICATION

This application claims priority from Korean Patent Application No. 10-2008-0087426, filed on Sep. 4, 2008, in the Korean Intellectual Property Office, the disclosure of which is incorporated herein in its entirety by reference.

BACKGROUND OF THE INVENTION

1. Field of the Invention

Apparatuses and methods consistent with the present invention relate to image processing, and more particularly, to image processing apparatuses and methods that receive an image and store or display the received image.

2. Description of the Related Art

Generally, image processing apparatuses may receive an image and store or display the received image.

The image processing apparatuses may perform a plurality of operations. In order to do so, the image processing apparatuses are also required to set an order of performing these operations and to efficiently distribute a time for each of the plurality of operations.

However, in related-art image processing apparatuses, the time and the order of performing operations are not efficiently distributed.

SUMMARY OF THE INVENTION

According to an aspect of the present inventive concept, there is provided an image processing apparatus that minimizes unnecessary operations for protecting resources, by scheduling an operation time of each of tasks to be performed according to an image processing frame rate of each of the tasks.

According to one or more exemplary embodiments, there is provided an image processing apparatus including: at least one image input unit, to which a plurality of input images are input according to respective frame rates; and a controller that arranges an operation time and an operation order of each of tasks for processing a corresponding image of the plurality of input images according to the respective frame rates, and performs each of the tasks according to the operation time and the operation order.

An operation period of each of the tasks may be determined according to a corresponding frame rate, and each of the tasks may be performed according to the operation period.

Each of the tasks may be performed for a unit time at given time intervals.

The tasks to be performed for the unit time may be sequentially performed according to the operation period.

The operation order of the tasks to be performed for the unit time may be determined by the operation period of each of the tasks, and a task table that defines the tasks to be performed for the unit time may be generated.

The tasks may be performed for the unit time according to the task table.

BRIEF DESCRIPTION OF THE DRAWINGS

The above and other aspects of the present inventive concept will become more apparent by describing in detail exemplary embodiments thereof with reference to the attached drawings, in which.

DETAILED DESCRIPTION OF EXEMPLARY EMBODIMENTS

Hereinafter, the present inventive concept will be described more fully with reference to the accompanying drawings, in which exemplary embodiments are shown.

Figure 1:
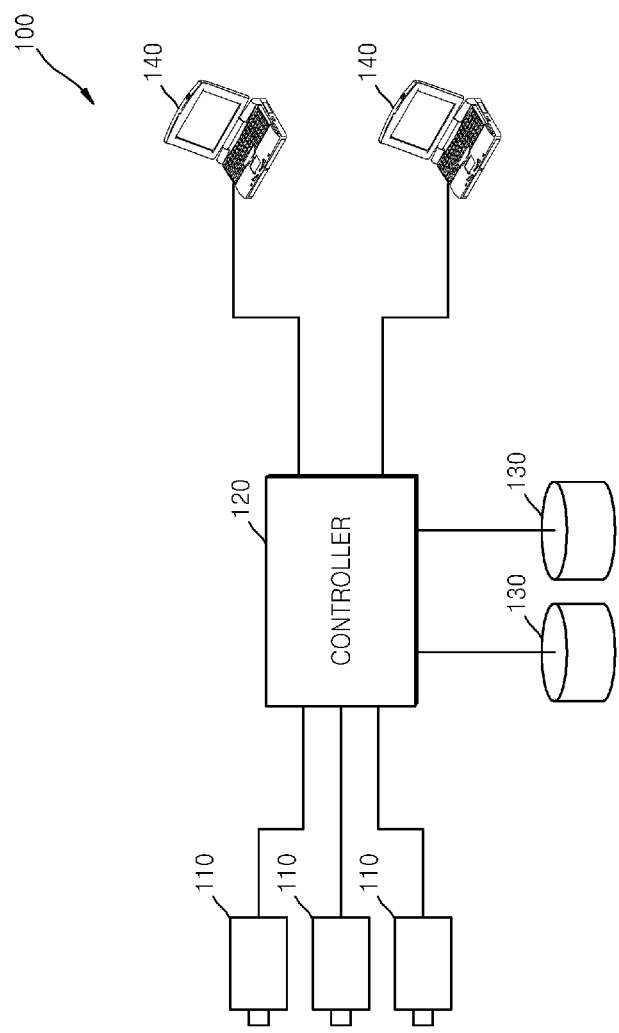
FIG. 1 is a perspective view schematically illustrating an image processing apparatus, according to an exemplary embodiment.

FIG. 1 is a perspective view schematically illustrating an image processing apparatus 100, according to an exemplary embodiment of the present invention.

Referring to FIG. 1, the image processing apparatus 100 includes an image input unit 110, a controller 120, a storage unit 130, and a display unit 140.

The image input unit 110 receives a plurality of input images that are input according to respective frame rates. The image processing apparatus 100 may include a plurality of the image input units 110.

The controller 120 may arrange an operation time and an operation order of each of tasks in a row for processing each of the plurality of input images according to the respective frame rates, and sequentially perform each task. The storage unit 130 stores the plurality of input images. The display unit 140 displays the plurality of input images.

The image input unit 110 receives the plurality of input images from outside the image processing apparatus 100, includes a camera, and may receive the plurality of input images via the camera. Here, there may be more than one of the image input units 110, and each of the image input units 110 may receive respective input images.

Each of the image input units 110 may receive respective input images according to respective frame rates. In other words, each of the image input units 110 may receive input images in a corresponding frame unit, in which a frame unit is a time interval set according to a given frame rate.

Each of the image input units 110 may be an Internet protocol (IP) camera, wherein each IP camera is connected to the controller 120 via a network. Here, the network that connects the image input units 110 to the controller 120 may be any type of network, such as a wired network or a wireless network.

However, the image input units 110 are not limited to being IP cameras, and may be any type of image input device or may be an input device that receives images from a storage unit or any type of system connected via a network.

An input image transmitted via a network or a codec may be converted into data according to a given frame rate. For example, if the given frame rate is 10 frames per second, then an input image may be converted into data every 100 ms. In this case, the controller 120 may process the data of the input image every 100 ms.

In the image processing apparatus 100 according to the current exemplary embodiment, the controller 120 may operate in connection with a frame rate of an image input. In other words, data flow is linked with each of input images according to a frame rate of the image input, and thus the controller 120 can perform various operations, such as transmitting of data or storing of data, without protecting the data between the operations.

In order to perform various operations, the controller 120 may use a scheduler. A system may be formed by using a general-purpose scheduler provided by an operating system (OS) of the controller 120, or by using a single task.

When a system is formed by using a general-purpose scheduler, a point of time when each of tasks for various operations is performed cannot be determined. Accordingly, a synchronizer or a mutex is used between tasks so as to synchronize the tasks or protect resources between the tasks.

In other words, when the general-purpose scheduler is used, a point of time when each of tasks or threads is performed cannot be determined, and thus synchronization between tasks or threads is performed by using a mutex, an event, or a semaphore.

However, when a mutex or the like is used, an image to be processed may not be processed. When such images that are not processed accumulate, efficiency of using the controller 120, specifically a central processing unit (CPU) of the controller 120, may be reduced. In addition, additional operations for processing a multi-task or multi-thread are required.

Also, when the general-purpose scheduler is used, software may be programmed to process data periodically at even time intervals, but it is difficult to perform various operations according to each of tasks or threads, and thus accurate time adjustment may be difficult. Also, when the number of tasks or threads to be processed is large, the tasks or threads are sporadically performed. Accordingly, an additional device for protecting resources between the tasks may be required, and time delay for generating switching between tasks may occur.

However, the image processing apparatus 100 according to the current exemplary embodiment uses an exclusive scheduler that sets an operation time and an operation order of each of tasks or threads by using a frame rate of an image input, and thus an optimum system for processing an input image may be formed. Accordingly, the image processing apparatus 100 may smoothly process an input image, and a stable system may be formed by increasing a design margin.

Accordingly, the exclusive scheduler, which sets an operation time of each of tasks according to a frame rate of an image input and performs the tasks by arranging the operation times of the tasks in a row, may be used. In this case, the controller 120 that is used for switching between tasks may be used for other operations, and a resource protecting operation for preventing data from being damaged by another operation may be removed.

Accordingly, the controller 120 may arrange an operation time and an operation order of each of tasks for processing each of input images according to a frame rate, and sequentially perform the tasks. Here, an operation period of a task is determined according to the frame rate of each of the tasks, and the task may be performed according to the operation period.

Also, the tasks may be performed for a unit time at given time intervals. Here, the unit time may be sufficient to perform a plurality of tasks. The tasks may be sequentially performed for the unit time according to the operation period.

Accordingly, the operation order of the tasks to be performed for the unit time is determined by the operation period of each of the tasks. A task table that defines the tasks to be performed for the unit time may be generated. Also, the tasks may be performed for the unit time according to the task table.

Specifically, the number of tasks processed by the controller 120 may be more than one, and at least one selected from the group consisting of a first task, a second task, and a third task may be performed.

Here, the first task may be an operation of receiving an input image via the input image unit 110, the second task may be an operation of storing the input image in the storage unit 130, and the third task may be an operation of displaying the input image on the display unit 140.

Here, the storage unit 130 may include a storage medium for storing the input image. The display unit 140 may be a monitor or a terminal computer for displaying the input image.

Also, the controller 120 may be a digital video recorder (DVR) or a network video controller (NVR), and may include a central processing unit (CPU) for performing the first, second, or third task.

Figure 2:
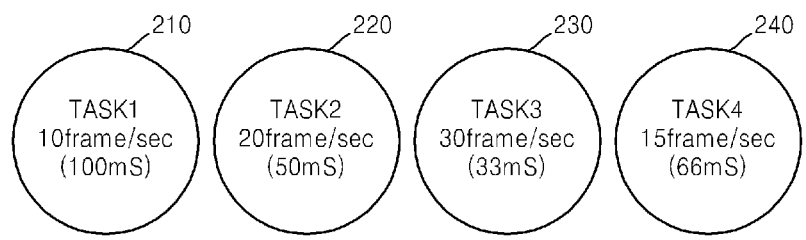
FIG. 2 is a diagram schematically illustrating tasks processed by a controller of FIG. 1, according to exemplary embodiments.
Figure 3:
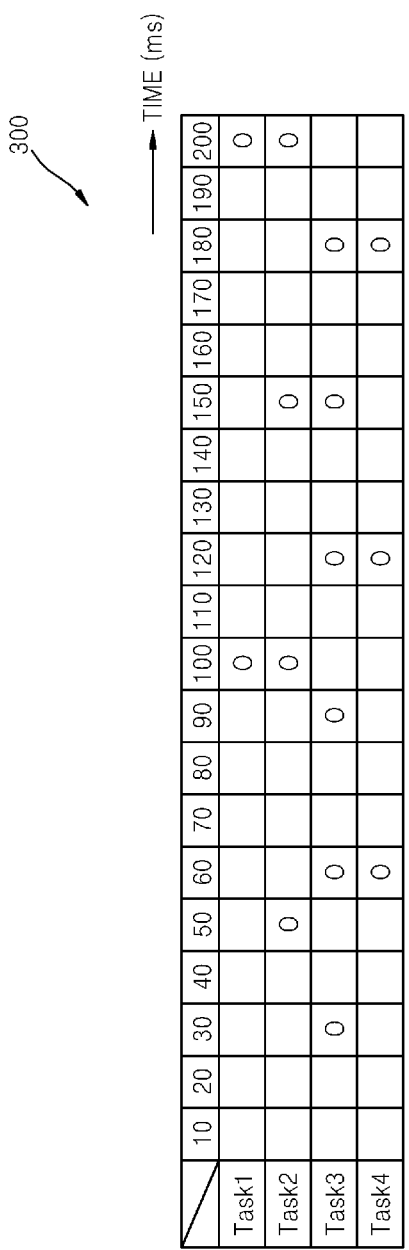
FIG. 3 is a diagram schematically illustrating a task table for performing the tasks of FIG. 2 by using a controller of the image processing apparatus of FIG. 1, according to an exemplary embodiment.

FIG. 2 is a diagram schematically illustrating a plurality of tasks processed by the controller 120 of FIG. 1, according to an exemplary embodiment, and FIG. 3 is a diagram schematically illustrating a task table 300 for performing the plurality of tasks of FIG. 2 by using the controller 120 of FIG. 1, according to an exemplary embodiment.

An exemplary embodiment of performing a plurality of tasks by using an exclusive scheduler of the controller 120 may be described with reference to FIGS. 2 and 3. The plurality of tasks may be a first task 210, a second task 220, a third task 230, and a fourth task 240.

The first task 210 may be processed at a frame rate of 10 frames per second, and in this case, the first task 210 may be performed every 100 ms. The second task 220 may be performed at a frame rate of 20 frames per second, and in this case, the second task 220 may be performed every 50 ms.

The third task 230 may be processed at a frame rate of 30 frames per second, and in this case, the third task 230 may be performed every 33 ms. The fourth task 240 may be performed at a frame rate of 15 frames per second, and in this case, the fourth task 230 may be performed every 66 ms.

Here, an operation period of the first task 210 is 100 ms, an operation period of the second task 220 is 50 ms, an operation period of the third task 230 is 33 ms, and an operation period of the fourth task 240 is 66 ms.

Operation times and operation orders of the tasks including the first, second, third, and fourth tasks 210, 220, 230, and 240 may be defined by the task table 300 of FIG. 3. A unit time may be sufficiently determined to process at least two tasks.

Here, a unit time for performing each task is 10 ms, and thus each task may be processed in a unit of 10 ms. An operation time and an operation order of each of the first, second, third, and fourth tasks 210, 220, 230, and 240 may be arranged in a row in a unit time of 10 ms according to frame rates, and the first, second, third, and fourth tasks 210, 220, 230, and 240 may be sequentially performed in the arranged order.

Accordingly, according to the task table 300 of FIG. 3, the third task 230 is performed in the unit time between 20 ms and 30 ms, and the second task 220 is performed in the unit time between 40 ms and 50 ms.

Also, the third and fourth tasks 230 and 240 are sequentially performed in the unit time between 50 ms and 60 ms, and the third task 230 is performed in the unit time between 80 ms and 90 ms.

The first and second tasks 210 and 220 are sequentially performed in the unit time between 90 ms and 100 ms, and the third and fourth tasks 230 and 240 are sequentially performed in the unit time between 110 ms and 120 ms.

The second and third tasks 220 and 230 are sequentially performed in the unit time between 140 ms and 150 ms, the third and fourth tasks 230 and 240 are sequentially performed in the unit time between 170 ms and 180 ms, and the first and second tasks 210 and 220 are sequentially performed in the unit time between 190 ms and 200 ms.

As illustrated in FIG. 3, when points of time when each task are performed according to a frame rate are arranged in a row, 10 ms, 20 ms, 40 ms, 70 ms, 80 ms, 110 ms, 130 ms, 140 ms, 160 ms, 170 ms, and 190 ms are a surplus time, and thus even when two tasks are arranged to be performed in the same unit time, the two tasks can be sufficiently performed since 10 ms is sufficient for performing the two tasks.

According to exemplary embodiments of the present invention, the image processing apparatus 100 uses a specialized exclusive scheduler so as to determine an operation time and an operation order of tasks or threads according to a frame rate of the tasks or threads, thereby efficiently assigning an operation time of the controller 120 to process an image.

Accordingly, even when a task is performed by a CPU having low performance, the task shows sufficient performance, and the controller 120 can perform other operations during a surplus time. Accordingly, the image processing apparatus 100 may perform multi-tasking.

According to an image processing apparatus of the exemplary embodiments, unnecessary operations for protecting resources are minimized by scheduling an operation time of each of tasks according to an image processing frame rate of each of the tasks.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. An image processing apparatus comprising:
   at least one image input unit, to which a plurality of input images are input according to respective frame rates; and
   a controller that arranges an operation time and an operation order of each of tasks for processing a corresponding image of the plurality of input images according to the respective frame rates, and performs each of the tasks according to the operation time and the operation order,
   wherein the operation time of each of the tasks is calculated based on the respective frame rates of each of the tasks, and the tasks are performed at sequential integer intervals of their respective operation time,
   wherein the sequential integer intervals are greater than one, and
   wherein the sequential integer intervals are less than one second.

2. The image processing apparatus of claim 1, wherein each of the tasks is performed for a unit time at sequential integer time intervals of their respective operation time.

3. The image processing apparatus of claim 2, wherein the tasks to be performed for the unit time are sequentially performed according to their respective operation time.

4. The image processing apparatus of claim 2, wherein the operation order of the tasks to be performed for the unit time is determined by the operation time of each of the tasks, and a task table that defines the tasks to be performed for the unit time is generated.

5. The image processing apparatus of claim 2, wherein at least two tasks are performed in the unit time.

6. The image processing apparatus of claim 4, wherein the tasks are performed for the unit time according to the task table.

7. The image processing apparatus of claim 4, wherein the image input unit comprises an internet protocol (IP) camera connected to the controller via a network.

8. The image processing apparatus of claim 4, wherein the task table further defines the operation time and the operation order for each the tasks to be performed.

9. The image processing apparatus of claim 1, wherein the controller comprises a digital video recorder (DVR) or a network video recorder (NVR).

10. The image processing apparatus of claim 1, further comprising:
    a storage unit that stores the input images; and
    a display unit that displays the input images.

11. The image processing apparatus of claim 10, wherein the tasks performed by the controller comprise a first task for receiving the input images, a second task for storing the input images in the storage unit, and a third task for displaying the input images on the display unit.

12. The image processing apparatus of claim 1, wherein each of the respective frame rates is defined by a number of image frames processed in a given time.

13. The image processing apparatus of claim 1, wherein the at least one image input unit comprises a plurality of input units, and
    each of the plurality of input images is input to each of the plurality of input units.

14. The image processing apparatus of claim 13, wherein each of the tasks is performed for a unit time at sequential integer time intervals of their respective operation time.

15. The image processing apparatus of claim 13, wherein the tasks to be performed for the unit time are sequentially performed according to their respective operation time.

16. The image processing apparatus of claim 13, wherein the operation order of the tasks to be performed for the unit time is determined by the operation time of each of the tasks, and a task table that defines the tasks to be performed for the unit time is generated.

17. An image processing apparatus comprising:
    a plurality of image input units which receive respective input images, each input image having a corresponding frame rate; and
    a controller that performs respective tasks corresponding to the respective input images,
    wherein an operation time and an operation order of each of the respective tasks is arranged based on the corresponding frame rate,
    wherein the operation time of each of the tasks is calculated based on the corresponding frame rate of each of the tasks, and the tasks are performed at sequential integer intervals of their respective operation time,
    wherein the sequential integer intervals are greater than one, and
    wherein the sequential integer intervals are less than one second.

18. The image processing apparatus of claim 17, wherein each of the respective tasks comprises processing a corresponding image.

19. An image processing method comprising:
    receiving a plurality of input images using a plurality of image input units, each input image having a corresponding frame rate; and
    performing respective tasks corresponding to the respective input images, wherein an operation time and an operation order of each of the respective tasks is arranged based on the corresponding frame rate, wherein the operation time of each of the tasks is calculated based on the corresponding frame rate of each of the tasks, and the tasks are performed at sequential integer intervals of their respective operation time, wherein the sequential integer intervals are greater than one, and wherein the sequential integer intervals are less than one second.

20. The image processing method of claim 19, wherein each of the respective tasks comprises processing a corresponding image.

* * * * *